United States Patent [19]

Clothiaux et al.

[11] Patent Number: 5,206,720
[45] Date of Patent: Apr. 27, 1993

[54] APPARATUS AND TECHNIQUE FOR MONITORING COMPONENT POSITION DURING TIRE BUILDING

[75] Inventors: John D. Clothiaux, Copley, Ohio; Sheldon Smilo, San Diego, Calif.

[73] Assignee: Bridgestone Corporation, Tokyo, Japan

[21] Appl. No.: 808,783

[22] Filed: Dec. 16, 1991

[51] Int. Cl.⁵ .......................... H04N 7/00; H04N 7/18
[52] U.S. Cl. ..................................... 358/101; 358/107; 156/394.1; 33/288
[58] Field of Search .......................... 358/33, 101, 107; 156/130, 131, 405.1, 406.4, 64, 378, 379, 394.1; 33/286, 288

[56] References Cited

U.S. PATENT DOCUMENTS

| | | | |
|---|---|---|---|
| 4,095,464 | 6/1978 | Breidijk | 358/101 |
| 4,727,419 | 2/1988 | Yamada et al. | 358/101 |
| 4,745,469 | 5/1988 | Waldecker et al. | 358/107 |
| 4,910,411 | 3/1990 | Terapuchi et al. | 358/106 |
| 4,974,077 | 11/1990 | Kusaka | 358/107 |

FOREIGN PATENT DOCUMENTS 1-332546  12/1989  Japan .

Primary Examiner—John K. Peng
Attorney, Agent, or Firm—Ernst H. Ruf

[57] ABSTRACT

A system and technique for monitoring the positions of the lateral edges of tire components during a tire building operation. Fluorescent lamps are positioned on opposite sides of the tire building drum to orthogonally impinge light onto the vertical cut edges of the tire components. The cut ply cords exposed at these vertical edges reflect the light to a camera having a portion of the tire building drum and the ply laminate within its field of view. The camera is controlled to obtain pairs of data windows, one on each side of the belt laminate, at fixed and spaced intervals along the circumference of the laminate. A mosaic is then generated from these data windows to illustrate the amount of walking, snaking, or centering of the tire building components during the manufacturing process.

20 Claims, 2 Drawing Sheets

APPARATUS AND TECHNIQUE FOR MONITORING COMPONENT POSITION DURING TIRE BUILDING

TECHNICAL FIELD

The invention herein resides in the art of apparatus and techniques for building pneumatic tires. More particularly, the invention relates to an apparatus and technique for automated monitoring of the various tire components as they are laid upon a building drum during the tire building process and allowing for an assessment of the alignment of the components upon the drum and with respect to each other.

BACKGROUND ART

It is well known that during the building of pneumatic tires, a plurality of tire components, such as stabilizer plies and treads, for example, are laid upon a tire building drum for the formation of a "green" or uncured tire. It has further been found and is well know that tire performance, wear, and other features are directly dependent upon the accuracy with which the tire is "built." In other words, the alignment of the tire components with respect to each other and with respect to the center line of the tire itself is paramount in assuring a tire which performs and wears properly.

Since tire building is, to a large extent, performed manually, human error is to be expected. Often times the tire components walk or "snake" about the tire building drum, deviating from the desired lateral position relative to the tire building machine. These deviations may come about due to some error in judgment of the operator, or may gradually appear in the operator's work effort over a course of time. In additional, machine misalignment, machine control errors, or material variations may occur and, because of the gradual nature of the evolvement of such errors, not be detected.

Of particular interest to the invention herein is an apparatus and technique which allows for the monitoring of the lateral edges of the components of a tire as it is being built upon a drum and to render an indication of the alignment of those components with each other and with the center line of the tire immediately after the placement of the components upon the drum. Previously, it has been known from Japanese Patent Application No. 1-332546, entitled "Apparatus For Detecting Edge Positions Of Material," to employ a pair of cameras above a drum receiving components of material thereon and to sense and/or monitor the positions of the lateral edges of the components thereby. This art particularly teaches that the component edges can be made apparent by means of illuminating the edges in such a manner as to cast a shadow, with the cameras monitoring the position of the shadow rather than the position of the component edges themselves. Such is given to inherent inaccuracies and difficulties in calibration. Since the two edges are viewed by separate cameras, correlating the images between the two cameras is required, but is difficult to implement. Further, should the thicknesses of the components vary, the shadows cast thereby will not be predictably indicative of the position of the edge itself.

Accordingly, there is a need in the art for an apparatus and technique for monitoring the component edges in a tire building process which is absent the shortcomings of the prior art.

DISCLOSURE OF INVENTION

In light of the foregoing, it is a first aspect of the invention to provide an apparatus and technique for monitoring the component edges in a tire building process in which a single camera is employed, eliminating the alignment and registration problems inherent in prior art dual camera systems.

Another aspect of the invention is the provision of an apparatus and technique for monitoring the component edges in a tire building process in which a direct view of the edges of each of the component is achieved, obviating the need for generating a shadow for such monitoring.

Another aspect of the invention is the provision of an apparatus and technique for monitoring the component edges in a tire building process which may be employed in an on-line system.

Yet a further aspect of the invention is the provision of an apparatus and technique for monitoring the component edges in a tire building process which is highly accurate in its readings, while being reliable and durable in operation.

The foregoing and other aspects of the invention which will become apparent as the detailed description proceeds are achieved by a measurement system for a tire building apparatus, comprising: a drum for receiving tire components, said drum being rotatable about an axis; a camera having a field of view encompassing a portion of said drum receiving the tire components; illumination means on either side of said drum for directly illuminating edge portions of the tire components; and processing means interconnected with said camera for acquiring and presenting video data of selected discrete sections of said edge portions of the tire components and thereby evidencing any lateral displacement of such tire components.

Further aspects of the invention are attained by a method for monitoring and measuring tire component displacement during a tire building process, comprising: rotating a drum having tire components thereon about an axis; directly illuminating side edges of the tire components during said rotation; obtaining video data of selected portions of said tire components as said drum is rotated; and generating a mosaic of said video data of said selected portions.

BRIEF DESCRIPTION OF DRAWINGS

For a complete understanding of the objects, techniques and structure of the invention, reference should be made to the following detailed description and accompanying drawings wherein.

BEST MODE FOR CARRYING OUT THE INVENTION

Figure 1:
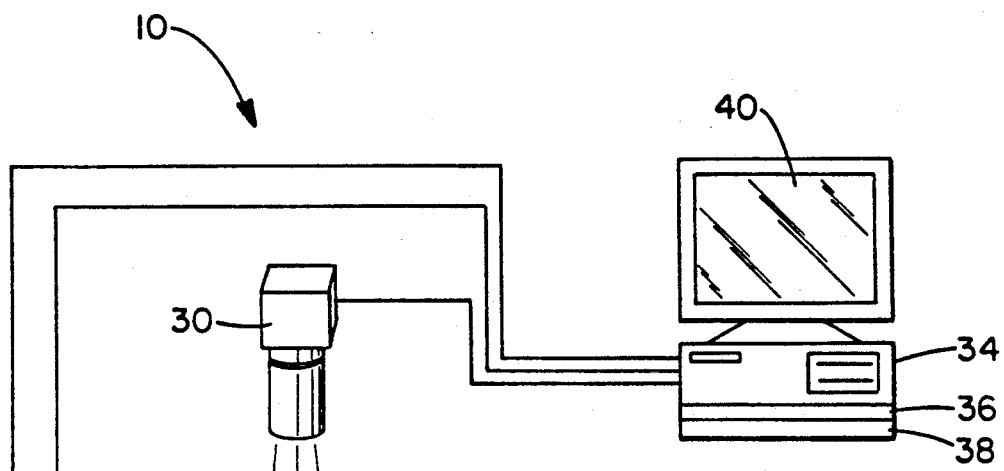
FIG. 1 is an illustrative view of the tire building measurement system according to the invention.

Referring now to the drawings and more particularly FIG. 1, it can be seen that a tire building measurement system according to the invention is designated generally by the numeral 10. The system 10 includes a tire building drum or chuck 12 which is actually received upon a hub 14 and rotatable in a direction as indicated by the arrow 16. As is well known and understood by those skilled in the art, the drum 12 is adapted to receive various components of a tire during a tire building operation. The components are placed thereon by an operator, a tire builder, or an automatic belt server in such a fashion as to devise an appropriate "green" tire for subsequent introduction into the tire curing operation.

In the drawing of FIG. 1, the drum 12 receives a first component such as a stabilizer ply 18 which, in turn, receives a second component such as a second stabilizer ply 20. The ply 18 is slightly wider than the ply 20 such that the ply 20 can be totally received upon and maintained within the confines of the lateral edges of the ply 18. As is further well known and understood by those skilled in the art, the ply 18 is spliced as at 22, while the ply 20 is spliced as at 24, both splices being presented on a bias and formed in accordance with standard tire building procedures. As will further be appreciated by those skilled in the art, each of the plies 18, 20 comprises an elastomeric material having cords of metal or synthetic material imbedded therein. The lateral edges of the plies 18, 20 accordingly expose cross sectional cut portions of the reinforcement cords.

Positioned on opposite vertical sides of the drum 12 are lamps 26, 28 which may be of any suitable nature, but which are preferably fluorescent lamps. The fluorescent lamps 26, 28 are substantially aligned with the circumferential surface of the drum 12 by being radially displaced from the axis of the drum 12 a distance substantially equal to the radius thereof. Accordingly, the light from the fluorescent lamps 26, 28 impinges upon the vertical side edges of the plies 18, 20 in an orthogonal or normal fashion. It has been found that fluorescent light orthogonally incident to the exposed cut cords, cut rubber edges or a raised surface, such as a reference rib, on a green tread, in the vertical edges of the tire components results in substantial amplitudes of reflected light from such surface, again being readily conducive to video imagery.

Maintained in fixed position with respect to the drum 12 is an appropriate camera or vidicon such as a charge coupled device (CCD) 30. Of course, it will be appreciated that an appropriate linear sensor, optical position sensor, or other optical imaging device could be employed for the intended purpose. In the preferred embodiment of the invention, the CCD 30 is fixedly positioned with respect to the drum 12 such that center of the field of view of the CCD 30 is aligned with the lateral center of the drum 12 and, accordingly, the intended lateral center of the plies or components 18, 20. Further, it is preferred that the axis of the lens of the CCD 30 be perpendicular or normal to the axis of the drum 12 such that the field of view of the CCD 30 is normal to the axis of the drum. Accordingly, as the drum 12 rotates, the center of the surface of the drum 12 will be collinear with the center line of the field of view of the CCD 30. Such field of view is designated generally by the numeral 32 and indicated by dashed lines in FIG. 1.

Also maintained as part and parcel of the system 10 is a microprocessor 34 or other suitable control and processing unit. The microprocessor 34 includes a timing board 36 and a frame grabber board 38 as is well known and understood by those skilled in the art. Additionally, the microprocessor 34 communicates with a video screen 40 for displaying data and otherwise communicating with the operator. Of course, a keyboard or other appropriate input/output device would also be employed in communication with the microprocessor 34 as part and parcel of the system 10.

A trigger switch 42 is maintained in communication with the drum 12 such that the trigger switch 42 is actuated upon each rotation of the drum 12, and such that one complete rotation of the plies 18, 20 through the field of view 32 of the CCD 30 is achieved between such switch actuations. Those skilled in the art will readily understand the trigger switch 42 may comprise a magnetic switch or other appropriate contact or non-contact switch to achieve the desired result. In the preferred embodiment, an actuation member 44 is fixedly attached to the drum 12 and positioned to come into actuating communication with the trigger switch 42 upon each rotation of the drum 12.

If the drum 12 is caused to rotate at a fixed rotational velocity, specific locations on the plies 18, 20 within the field of view 32 can be determined at any point in time as a function of the time elapsed following actuation of the switch 42. It is also contemplated that monitoring of the position of points within the field of view 32 may be determined by implementation of an appropriate encoder 46 maintained in contacting engagement with the drum 12 or plies 18, 20. The encoder, like a tachometer emits a pulse for each fixed increment of rotation of the drum 12 and, accordingly, for each fixed incremental movement of the plies 18, 20. The encoder 46, of course, does not require constant rotational velocity of the drum 12, as does implementation of the trigger switch 42.

According to the invention, it is desirable to employ the CCD or camera 30 to view both lateral edges of each of the plies 18, 20 to determine if they run parallel and symmetric to the center line of the drum 12, or if they walk or "snake" from side to side. Accordingly, it is desirable to look at a specific portion of selected uniformly spaced frames of data acquired by the CCD 30 about the drum 12 during a full rotation thereof. The CCD 30 acquires a fixed number of frames per second. The number of frames thus obtained during one revolution of the drum 12 is equivalent to the speed of the CCD 30 divided by the number of revolutions per second made by the drum 12. For example, if the CCD 30 obtains 30 data frames per second, and if the drum 12 rotates at the rate of ½ revolution per second, 60 frames of data are obtained per revolution. The invention contemplates seizing uniformly spaced data windows about the circumference of the drum 12, rather than viewing and processing the entirety of all of the data obtained during one revolution. In the example given, if only 30 data windows are desired, then only half of the data frames obtained from one revolution need be considered. Accordingly, every other data frame during the data acquisition process of the CCD 30 may be masked, ignored, or discarded.

Figure 2:
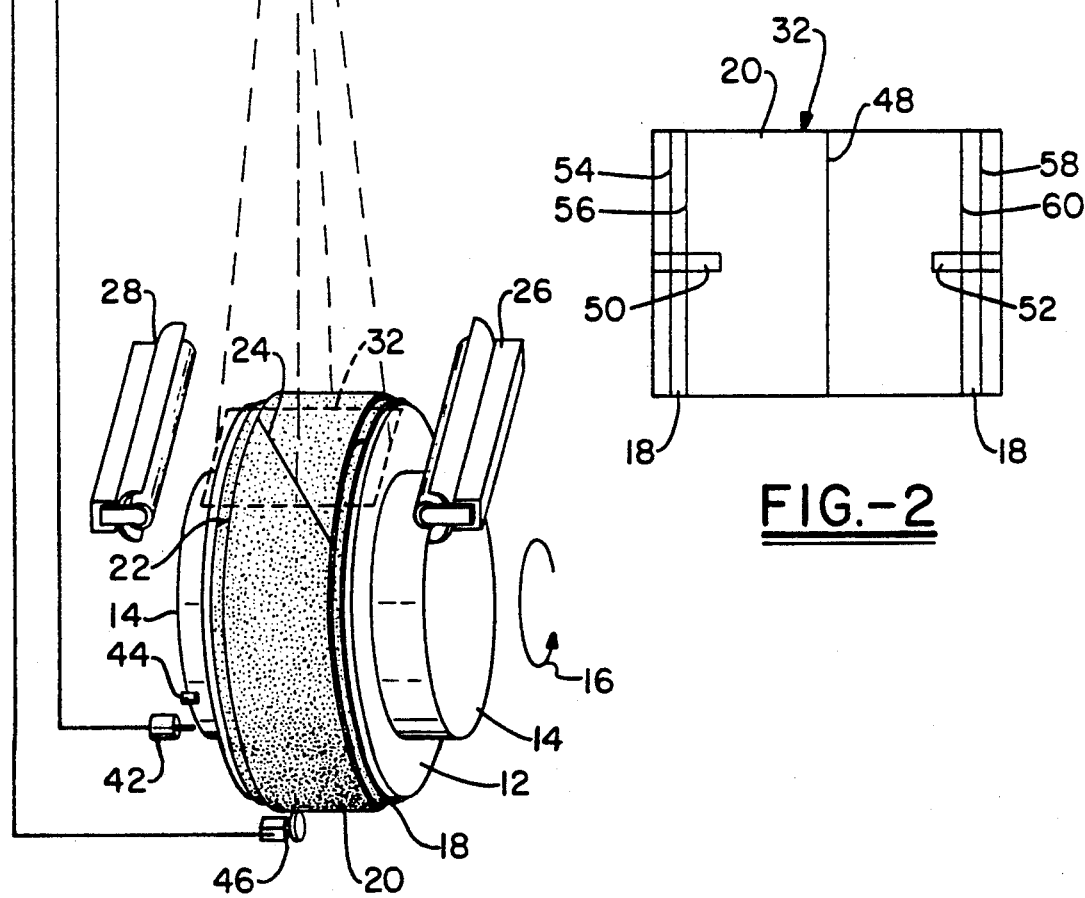
FIG. 2 is an illustration of the field of view of the camera employed in the system of FIG. 1.

It is further contemplated that the data sections or windows needed for appropriately assessing the linearity of the ply edges need only traverse the ply edges, and need not extend across the entirety of the ply lamination. As shown in FIG. 2, a field of view 32 of the CCD 30 has its centerline 48 substantially congruent or collinear with the centerline of the drum 12. When a frame of data is taken, only the data sections or windows 50, 52 which respectively traverse the left and right lateral edges of the plies 18, 20 are of interest and are obtained. The remainder of the data is masked by the frame grabber board 38 which, as discussed above, also totally eliminates alternating frames of data such that windows 50, 52 are obtained from alternating data frames. Of course, the specific masking or elimination of frames and portions of frames will depend upon the speed of the camera 30, the rotational speed of the drum 12, and the resolution and number of data points desired. As shown, the left edge 54 of the ply 18 and the left edge 56 of the ply 20 appear within the data window 50, while the right edge 58 of the ply 18 and the right edge 60 of the ply 20 appear within the data window 52. With the edges 54, 56, 58, 60 having exposed cords of metal or other reflective material, and further typically exposing sharp cut edges, a bright reflective surface is provided to reflect the light incident thereto from the lamps 26, 28 to the camera 30. Accordingly, the camera 30 views the actual edges of the plies and obtains light data therefrom which is digitized and stored for each of the data windows 50, 52. In the embodiment discussed above, 30 such pairs of the data windows 50, 52 would be obtained during a single rotation of the drum 12.

It should be appreciated that the windows 50, 52 are laterally aligned with each other in pairs, and are uniformly spaced along the laminate of the plies 18, 20 as achieved through control of the timing board 36 and the encoder 46 or switch 42. Rotational speed of the drum 12 may be regulated such that the masking of frames and windows by the frame grabber board 38 will assure a pair of data windows every 1-5 inches longitudinally along the laminate of the plies 18, 20.

Figure 3:
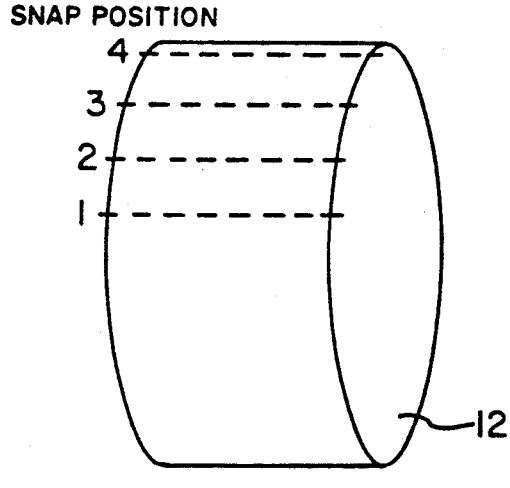
FIG. 3 is an illustrative view of the building drum of FIG. 1 showing the position of the data acquisition sectors thereof.
Figure 4:
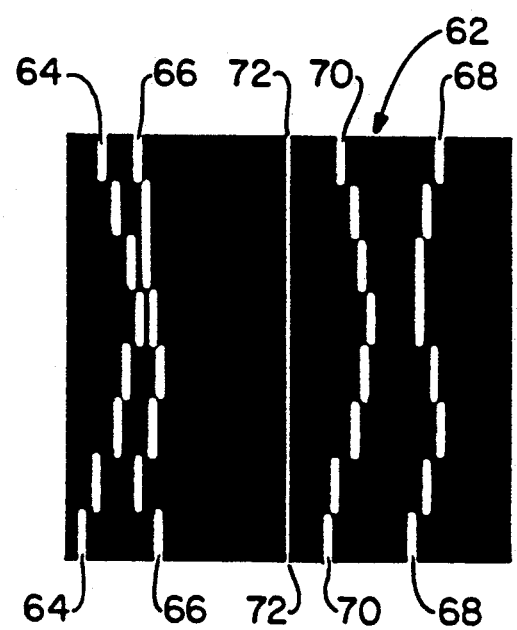
FIG. 4 is a mosaic of the data illustrative of four component edges obtained employing the system of FIG. 1.

With reference to FIG. 3, it can be seen that data windows 50, 52 are obtained at positions 1, 2, 3 and 4, with the highly reflective vertical edge portions of the plies 18, 20 appearing within the windows 50, 52 being white in the digitized data form shown in FIG. 4. The data windows 50, 52 are presented in a mosaic, abutting each other, as shown in FIG. 4 and as may be displayed upon the video screen 40. As illustrated, the data mosaic 62 presents a discontinuous outer line 64 corresponding to the lateral position of the left edge 54 of the belt 18. Similarly, a discontinuous data line 66 tracks the lateral position of the left edge 56 of the belt 20. Similar discontinuous data lines 68, 70 are provided to track the lateral positions of the respective right edges 58, 60 of the belts 18, 20 as shown. The center line 72 of the drum 12 is also presented in the mosaic 62, as shown.

Those skilled in the art will readily appreciate that a view of the mosaic 62 quickly illustrates the amount of "snaking" of the edges of the plies 18, 20, and particularly with respect to a centerline 72. With a total of 30 or 40 pairs of data strips taken, the mosaic 62 provides an accurate depiction of the belt edges with respect to each other and with respect to the drum centerline. Accordingly, the operator can quickly detect any errors in his methodology and can scrap, repair or rework any unacceptable fabrication without proceeding further in the fabrication process for ultimate detection in final inspection. It will be appreciated that any number of data strips may be obtained and processed. Indeed, data could be acquired at such intervals as to circumferentially track the entirety of the belts or plies. It has been found that 30 to 40 pairs of data are usually quite adequate for the desired assessment.

Thus it can be seen that the objects of the invention have been satisfied by the structure presented above. A single camera may be employed in a direct view system with the belt edges of interest being directly and orthogonally illuminated by a pair of fluorescent lamps. The system may be employed on-line to give immediate and highly accurate readings to assist the tire builder in his fabrication process or to evaluate machine performance.

While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. A measurement system for tire building apparatus, comprising:
   a drum for receiving tire components, said drum being rotatable about an axis;
   a camera having a field of view encompassing a portion of said drum receiving the tire components;
   illumination means on either side of said drum for directly illuminating edge portions of the tire components; and
   processing means interconnected with said camera for acquiring, analyzing and presenting video data of selected discrete sections of said edge portions of the tire components and thereby evidencing any lateral displacement of such tire components.

2. The measurement system according to claim 1, wherein said processing means masks data acquired from said camera of said tire components.

3. The measurement system according to claim 2, wherein said data is masked such that said selected sections of said edge portions are uniformly circumferentially spaced about said drum.

4. The measurement system according to claim 3, wherein said selected discrete sections comprise laterally aligned pairs of such sections, each such pair comprising a section on each side of the tire components.

5. The measurement system according to claim 4, wherein said video data obtained by said processing means is acquired in one rotation of said drum about its said axis.

6. The measurement system according to claim 5, wherein said processing means further comprises a trigger switch communicating with said drum and actuated upon each rotation of said drum.

7. The measurement system according to claim 5, wherein said processing means further comprises an encoder communicating with said drum and presenting output signals corresponding to rotational positions of said drum during rotation.

8. The measurement system according to claim 5, wherein said illumination means casts light orthogonally onto said edge portions of the tire components.

9. The measurement system according to claim 5, wherein said camera has a lens having an axis substantially orthogonal to said axis of said drum.

10. The measurement system according to claim 5, wherein said processing means further comprises a video display screen for presenting a mosaic of said video data of said selected discrete sections of said edge portions.

11. The measurement system according to claim 5, wherein said processing means further comprises analyzing means for plotting said edge portions.

12. A method for monitoring and measuring tire component displacement during a tire building process, comprising:

rotating a drum having tire components thereon about an axis;

directly illuminating side edges of the tire components during said rotation;

obtaining video data of selected portions of said tire components as said drum is rotated; and generating a mosaic of said video data of said selected portions.

13. The method according to claim 12, wherein said video data is obtained with a camera and wherein a field of view of said camera is selectively masked to obtain said video data of said selected portions.

14. The method according to claim 13, further comprising the step of monitoring said rotating of said drum such that said selected portions of said tire components are uniformly spaced thereabout.

15. The method according to claim 14, wherein said step of masking said field of view of said camera separates said selected portions of said tire laterally and circumferentially.

16. The method according to claim 15, wherein uniformly spaced frames of said camera are fully masked.

17. The method according to claim 15, wherein said selected portions of said tire components comprise edge portions of said components.

18. The method according to claim 12, wherein said step of illuminating said side edges of the tire components is achieved with light orthogonally impending upon exposed faces of said side edges.

19. The method according to claim 18, wherein said video data is obtained through a single camera having both lateral edges of each of the tire components within its field of view.

20. The method according to claim 19, wherein said camera has a field of view projected along an axis, which axis is orthogonal to an axis about which said drum rotates.

* * * * *